US009830324B2

(12) United States Patent
Hunt et al.

(10) Patent No.: US 9,830,324 B2
(45) Date of Patent: Nov. 28, 2017

(54) CONTENT BASED ORGANIZATION OF FILE SYSTEMS

(71) Applicant: Exablox Corporation, Sunnyvale, CA (US)

(72) Inventors: Tad Hunt, Sunnyvale, CA (US); Frank E. Barrus, New Ipswich, NH (US)

(73) Assignee: Exablox Corporation, Sunnyvale, CA (US)

( * ) Notice: Subject to any disclaimer, the term of this patent is extended or adjusted under 35 U.S.C. 154(b) by 295 days.

(21) Appl. No.: 14/614,266

(22) Filed: Feb. 4, 2015

(65) Prior Publication Data

US 2015/0220578 A1 Aug. 6, 2015

Related U.S. Application Data

(60) Provisional application No. 61/935,618, filed on Feb. 4, 2014.

(51) Int. Cl.
*G06F 17/30* (2006.01)

(52) U.S. Cl.
CPC .............................. *G06F 17/30097* (2013.01)

(58) Field of Classification Search
CPC ......... G06F 17/30949; G06F 17/30067; G06F 17/30516; G06F 17/30864; G06F 17/30985
USPC ......................................... 707/747, 791, 802
See application file for complete search history.

(56) References Cited

U.S. PATENT DOCUMENTS

| | | | |
|---|---|---|---|
| 4,656,604 | A | 4/1987 | van Loon |
| 4,660,130 | A | 4/1987 | Bartley et al. |
| 5,420,999 | A | 5/1995 | Mundy |
| 5,561,778 | A | 10/1996 | Fecteau et al. |
| 6,098,079 | A | 8/2000 | Howard |
| 6,154,747 | A | 11/2000 | Hunt |

(Continued)

FOREIGN PATENT DOCUMENTS

| | | | |
|---|---|---|---|
| EP | 1285354 | A2 | 2/2003 |
| EP | 2575379 | A1 | 4/2013 |

(Continued)

OTHER PUBLICATIONS

Final Office Action, dated Nov. 27, 2015, U.S. Appl. No. 13/441,592, filed Apr. 6, 2012.

(Continued)

*Primary Examiner* — Richard Bowen
(74) *Attorney, Agent, or Firm* — Maschoff Brennan

(57) ABSTRACT

The methods and systems for organizing and managing a file system on top of a content addressable object store are provided. User content is associated with a record including a content hash associated with an address in the content addressable object store. The content hash is a function of user content and determined by dividing the file into data objects, generating a pointer tree of hashes on top of the data objects, and calculating a hash of the root of the pointer tree. The record, the pointer tree, and the file are stored in the object store. Reading user content from the object store includes reading the record, fetching the content hash to find a root of the pointer tree, descending leaves of the pointer tree to read the hashes of the data objects associated with user content, and reassembling the data objects in sequential file data.

23 Claims, 16 Drawing Sheets

(56) References Cited

U.S. PATENT DOCUMENTS 6,167,437 A 12/2000 Stevens et al.
6,314,435 B1 11/2001 Wollrath et al.
6,356,916 B1 3/2002 Yamatari et al.
6,480,950 B1 11/2002 Lyubashevskiy et al.
6,772,162 B2 8/2004 Waldo et al.
7,043,494 B1 5/2006 Joshi et al.
7,177,980 B2 2/2007 Milillo et al.
7,197,622 B2 3/2007 Torkelsson et al.
7,266,555 B1 9/2007 Coates et al.
7,293,140 B2 11/2007 Kano
7,392,421 B1 6/2008 Bloomstein et al.
7,403,961 B1 7/2008 Deepak et al.
7,454,592 B1 11/2008 Shah et al.
7,509,360 B2 3/2009 Wollrath et al.
7,539,836 B1 5/2009 Klinkner
7,685,109 B1 3/2010 Ransil et al.
7,725,437 B2 5/2010 Kirshenbaum et al.
7,827,218 B1 11/2010 Mittal
7,990,979 B2 8/2011 Lu et al.
8,019,882 B2 9/2011 Rao et al.
8,099,605 B1 * 1/2012 Billsrom ............. G06F 11/1448 713/187
8,132,168 B2 3/2012 Wires et al.
8,239,584 B1 8/2012 Rabe et al.
8,364,887 B2 1/2013 Wong et al.
8,407,438 B1 3/2013 Ranade
8,447,733 B2 5/2013 Sudhakar
8,478,799 B2 * 7/2013 Beaverson ........ G06F 17/30097 707/823
8,572,290 B1 10/2013 Mukhopadhyay et al.
8,606,751 B1 * 12/2013 Starling .............. G06F 11/1458 707/634
8,868,926 B2 10/2014 Hunt et al.
9,009,202 B2 4/2015 Patterson
9,043,567 B1 5/2015 Modukuri et al.
9,317,511 B2 * 4/2016 Kanfi ................ G06F 17/30082
2002/0069340 A1 6/2002 Tindal et al.
2002/0087590 A1 7/2002 Bacon et al.
2003/0028514 A1 2/2003 Lord et al.
2003/0028585 A1 2/2003 Yeager et al.
2003/0056139 A1 3/2003 Murray et al.
2003/0072259 A1 4/2003 Mor
2003/0101173 A1 5/2003 Lanzatella et al.
2003/0115408 A1 6/2003 Milillo et al.
2004/0093361 A1 5/2004 Therrien et al.
2004/0158588 A1 8/2004 Pruet
2004/0167898 A1 8/2004 Margolus et al.
2005/0071335 A1 3/2005 Kadatch
2005/0080928 A1 4/2005 Beverly et al.
2005/0081041 A1 4/2005 Hwang
2005/0160170 A1 7/2005 Schreter
2005/0256972 A1 11/2005 Cochran et al.
2006/0039371 A1 2/2006 Castro et al.
2006/0083247 A1 4/2006 Mehta
2006/0156396 A1 7/2006 Hochfield et al.
2006/0271540 A1 11/2006 Williams
2007/0005746 A1 1/2007 Roe et al.
2007/0130232 A1 6/2007 Therrien et al.
2007/0203960 A1 8/2007 Guo
2007/0230368 A1 10/2007 Shi et al.
2007/0233828 A1 10/2007 Gilbert
2007/0271303 A1 11/2007 Menendez et al.
2007/0276838 A1 11/2007 Abushanab et al.
2007/0276843 A1 11/2007 Lillibridge et al.
2008/0005624 A1 1/2008 Kakivaya et al.
2008/0016507 A1 1/2008 Thomas et al.
2008/0126434 A1 5/2008 Uysal et al.
2008/0133893 A1 6/2008 Glew
2008/0147872 A1 6/2008 Regnier
2008/0170550 A1 7/2008 Liu et al.
2008/0183973 A1 7/2008 Aguilera et al.
2008/0243879 A1 10/2008 Gokhale et al.
2008/0243938 A1 10/2008 Kottomtharayil et al.
2008/0244199 A1 10/2008 Nakamura et al.
2008/0292281 A1 11/2008 Pecqueur et al.
2009/0049240 A1 2/2009 Oe et al.
2009/0100212 A1 4/2009 Boyd et al.
2009/0172139 A1 7/2009 Wong et al.
2009/0198927 A1 8/2009 Bondurant et al.
2009/0199041 A1 8/2009 Fukui et al.
2009/0307292 A1 12/2009 Li et al.
2009/0327312 A1 12/2009 Kakivaya et al.
2010/0023941 A1 1/2010 Iwamatsu et al.
2010/0031000 A1 2/2010 Flynn et al.
2010/0036862 A1 2/2010 Das et al.
2010/0049735 A1 * 2/2010 Hsu .................. G06F 17/30138 707/E17.005
2010/0114336 A1 5/2010 Konieczny et al.
2010/0114905 A1 5/2010 Slavik et al.
2010/0122330 A1 5/2010 McMillan et al.
2010/0161817 A1 6/2010 Xiao et al.
2010/0172180 A1 7/2010 Paley et al.
2010/0191783 A1 7/2010 Mason et al.
2010/0217953 A1 8/2010 Beaman et al.
2010/0228798 A1 9/2010 Kodama et al.
2010/0262797 A1 10/2010 Rosikiewicz et al.
2010/0318645 A1 12/2010 Hoole et al.
2010/0332456 A1 12/2010 Prahlad et al.
2011/0026439 A1 2/2011 Rollins
2011/0029711 A1 2/2011 Dhuse et al.
2011/0034176 A1 2/2011 Lord et al.
2011/0060918 A1 3/2011 Troncoso Pastoriza et al.
2011/0106795 A1 5/2011 Maim
2011/0138123 A1 6/2011 Gurajada et al.
2011/0213754 A1 9/2011 Bindal et al.
2011/0231374 A1 9/2011 Jain et al.
2011/0231524 A1 9/2011 Lin et al.
2011/0264712 A1 10/2011 Ylonen
2011/0264989 A1 10/2011 Resch et al.
2011/0271007 A1 11/2011 Wang et al.
2012/0011337 A1 1/2012 Aizman
2012/0030260 A1 2/2012 Lu et al.
2012/0030408 A1 2/2012 Flynn et al.
2012/0047181 A1 2/2012 Baudel
2012/0060072 A1 3/2012 Simitci et al.
2012/0078915 A1 3/2012 Darcy
2012/0096217 A1 4/2012 Son et al.
2012/0147937 A1 6/2012 Goss et al.
2012/0173790 A1 7/2012 Hetzler et al.
2012/0179808 A1 7/2012 Bergkvist et al.
2012/0179820 A1 7/2012 Ringdahl et al.
2012/0185555 A1 7/2012 Regni et al.
2012/0210095 A1 8/2012 Nellans et al.
2012/0233251 A1 9/2012 Holt et al.
2012/0278511 A1 11/2012 Alatorre et al.
2012/0290535 A1 11/2012 Patel et al.
2012/0290629 A1 11/2012 Beaverson et al.
2012/0310892 A1 12/2012 Dam et al.
2012/0323850 A1 12/2012 Hildebrand et al.
2012/0331528 A1 12/2012 Fu et al.
2013/0013571 A1 1/2013 Sorenson et al.
2013/0041931 A1 2/2013 Brand
2013/0054924 A1 2/2013 Dudgeon et al.
2013/0067270 A1 3/2013 Lee et al.
2013/0073821 A1 3/2013 Flynn et al.
2013/0086004 A1 4/2013 Chao et al.
2013/0091180 A1 4/2013 Vicat-Blanc-Primet et al.
2013/0162160 A1 6/2013 Ganton et al.
2013/0166818 A1 6/2013 Sela
2013/0185508 A1 7/2013 Talagala et al.
2013/0232313 A1 9/2013 Patel et al.
2013/0235192 A1 9/2013 Quinn et al.
2013/0246589 A1 9/2013 Klemba et al.
2013/0262638 A1 10/2013 Kumarasamy et al.
2013/0263151 A1 10/2013 Li et al.
2013/0268644 A1 10/2013 Hardin et al.
2013/0268770 A1 10/2013 Hunt et al.
2013/0282798 A1 10/2013 McCarthy et al.
2013/0288668 A1 10/2013 Pragada et al.
2013/0311574 A1 11/2013 Lal
2013/0339406 A1 * 12/2013 Kanfi ................ G06F 17/30082 707/825
2013/0346591 A1 12/2013 Carroll et al.
2013/0346839 A1 12/2013 Dinha

(56) References Cited

U.S. PATENT DOCUMENTS

| | | | |
|---|---|---|---|
| 2014/0006580 | A1 | 1/2014 | Raghu |
| 2014/0007178 | A1 | 1/2014 | Gillum et al. |
| 2014/0059405 | A1 | 2/2014 | Syu et al. |
| 2014/0143206 | A1 | 5/2014 | Pittelko |
| 2014/0297604 | A1 | 10/2014 | Brand |
| 2014/0317065 | A1 | 10/2014 | Barrus |
| 2014/0335480 | A1 | 11/2014 | Asenjo et al. |
| 2014/0351419 | A1 | 11/2014 | Hunt et al. |
| 2014/0372490 | A1 | 12/2014 | Barrus et al. |
| 2014/0379671 | A1 | 12/2014 | Barrus et al. |
| 2015/0012763 | A1 | 1/2015 | Cohen et al. |
| 2015/0019491 | A1 | 1/2015 | Hunt et al. |
| 2015/0066524 | A1 | 3/2015 | Fairbrothers et al. |
| 2015/0081964 | A1 | 3/2015 | Kihara et al. |
| 2015/0106335 | A1 | 4/2015 | Hunt et al. |
| 2015/0106579 | A1 | 4/2015 | Barrus |
| 2015/0172114 | A1 | 6/2015 | Tarlano et al. |
| 2015/0222616 | A1 | 8/2015 | Tarlano et al. |

FOREIGN PATENT DOCUMENTS

| | | | |
|---|---|---|---|
| EP | 2834749 | A1 | 2/2015 |
| EP | 2834943 | A1 | 2/2015 |
| EP | 2989549 | A1 | 3/2016 |
| EP | 3000205 | A1 | 3/2016 |
| EP | 3000289 | A2 | 3/2016 |
| EP | 3008647 | A1 | 4/2016 |
| EP | 3011428 | A1 | 4/2016 |
| EP | 3019960 | | 5/2016 |
| EP | 3020259 | | 5/2016 |
| JP | 2004252663 | A | 9/2004 |
| JP | 2008533570 | A | 8/2008 |
| JP | 2010146067 | A | 7/2010 |
| JP | 2011095976 | A | 5/2011 |
| JP | 2012048424 | A | 3/2012 |
| WO | WO2013152357 | A1 | 10/2013 |
| WO | WO2013152358 | A1 | 10/2013 |
| WO | WO2014176264 | A1 | 10/2014 |
| WO | WO2014190093 | A1 | 11/2014 |
| WO | WO2014201270 | A1 | 12/2014 |
| WO | WO2014205286 | A1 | 12/2014 |
| WO | WO2015006371 | A2 | 1/2015 |
| WO | WO2015054664 | A1 | 4/2015 |
| WO | WO2015057576 | A1 | 4/2015 |
| WO | WO2015088761 | A1 | 6/2015 |
| WO | WO2015116863 | A1 | 8/2015 |
| WO | WO2015120071 | A2 | 8/2015 |

OTHER PUBLICATIONS

Advisory Action, dated Feb. 9, 2016, U.S. Appl. No. 13/441,592, filed Apr. 6, 2012.
Final Office Action, dated Nov. 27, 2015, U.S. Appl. No. 14/171,651, filed Feb. 3, 2014.
Final Office Action, dated Nov. 20, 2015, U.S. Appl. No. 14/055,662, filed Oct. 16, 2013.
Advisory Action, dated Jan. 29, 2016, U.S. Appl. No. 14/055,662, filed Oct. 16, 2013.
Office Action, dated Dec. 10, 2015, U.S. Appl. No. 13/939,106, filed Jul. 10, 2013.
Non-Final Office Action, dated Jan. 11, 2016, U.S. Appl. No. 14/284,351, filed May 21, 2014.
Advisory Action, dated Jan. 12, 2016, U.S. Appl. No. 14/171,651, filed Feb. 3, 2014.
Office Action, dated Mar. 15, 2016, U.S. Appl. No. 14/171,651, filed Feb. 3, 2014.
Office Action, dated Apr. 5, 2016, U.S. Appl. No. 14/257,905, filed Apr. 21, 2014.
Office Action, dated Apr. 21, 2016, U.S. Appl. No. 14/105,099, filed Dec. 12, 2013.
Extended European Search Report dated Aug. 4, 2015 Application No. 13771965.4.
Dabek et al. "Wide-area cooperative storage with CFS", Proceedings of the ACM Symposium on Operating Systems Principles, Oct. 1 , 2001. pp. 202-215.
Stoica et al. "Chord: A Scalable Peer-to-peer Lookup Service for Internet Applications", Computer Communication Review, ACM, New York, NY, US, vol. 31, No. 4, Oct. 1 , 2001. pp. 149-160.
Extended European Search Report dated Aug. 20, 2015 Application No. 13772293.0.
Office Action dated Mar. 15, 2016 in Japanese Patent Application No. 2015-504769 filed Apr. 8, 2013.
Office Action, dated May 17, 2016, U.S. Appl. No. 14/303,329, filed Jun. 12, 2014.
Final Office Action, dated Jun. 1, 2016, U.S. Appl. No. 14/284,351, filed May 21, 2014.
Final Office Action, dated Jun. 1, 2016, U.S. Appl. No. 14/171,651, filed Feb. 3, 2014.
Final Office Action, dated Jun. 2, 2016, U.S. Appl. No. 13/939,106, filed Jul. 10, 2013.
Advisory Action, dated Jul. 6, 2016, U.S. Appl. No. 13/939,106, filed Jul. 10, 2013.
Notice of Allowance, dated Jul. 14, 2016, U.S. Appl. No. 14/303,329, filed Jun. 12, 2014.
Non-Final Office Action, dated Jul. 25, 2016, U.S. Appl. No. 14/309,796, filed Jun. 19, 2014.
Final Office Action, dated Aug. 9, 2016, U.S. Appl. No. 14/105,099, filed Dec. 12, 2013.
Non-Final Office Action, dated Nov. 5, 2013, U.S. Appl. No. 13/441,715, filed Apr. 6, 2012.
Notice of Allowance, dated Mar. 27, 2014, U.S. Appl. No. 13/441,715, filed Apr. 6, 2012.
Non-Final Office Action, dated Nov. 13, 2013, U.S. Appl. No. 13/441,592, filed Apr. 6, 2012.
Non-Final Office Action, dated May 19, 2014, U.S. Appl. No. 13/441,592, filed Apr. 6, 2012.
Final Office Action, dated Nov. 20, 2014, U.S. Appl. No. 13/441,592, filed Apr. 6, 2012.
Advisory Action, dated Feb. 19, 2015, U.S. Appl. No. 13/441,592, filed Apr. 6, 2012.
Non-Final Office Action, dated Jun. 24, 2015, U.S. Appl. No. 13/441,592, filed Apr. 6, 2012.
Non-Final Office Action, dated Jun. 29, 2015, U.S. Appl. No. 14/055,662, filed Oct. 16, 2013.
Non-Final Office Action, dated Aug. 11, 2015, U.S. Appl. No. 14/171,651, filed Feb. 3, 2014.
International Search Report dated Aug. 6, 2013 Application No. PCT/US2013/035675.
Huck et al. Architectural Support for Translation Table Management in Large Address Space Machines. ISCA '93 Proceedings of the 20th Annual International Symposium on Computer Architecture, vol. 21, No. 2. May 1993. pp. 39-50.
International Search Report dated Aug. 2, 2013 Application No. PCT/US2013/035673.
International Search Report dated Sep. 10, 2014 Application No. PCT/US2014/035008.
Askitis, Nikolas et al., "HAT-trie: A Cache-conscious Trie-based Data Structure for Strings".
International Search Report dated Sep. 24, 2014 Application No. PCT/US2014/039036.
International Search Report dated Oct. 22, 2014 Application No. PCT/US2014/043283.
International Search Report dated Nov. 7, 2014 Application No. PCT/US2014/042155.
International Search Report dated Jan. 21, 2015 Application No. PCT/US2014/060176.
International Search Report dated Feb. 24, 2015 Application No. PCT/US2014/060280.
International Search Report dated Mar. 4, 2015 Application No. PCT/US2014/067110.
International Search Report dated Apr. 2, 2015 Application No. PCT/US2014/045822.
International Sesarch Report dated May 14, 2015 Application No. PCT/US2015/013611.

(56) References Cited

OTHER PUBLICATIONS

International Sesarch Report dated May 15, 2015 Application No. PCT/US2015/014492.
Invitation pursuant to Rule 63(1) dated May 19, 2015 Application No. 13772293.0.
Joao, Jose et al., "Flexible Reference-Counting-Based Hardware Acceleration for Garbage Collection," Jun. 2009, ISCA '09: Proceedings of the 36th annual internaltional symposium on Computer Architecture, pp. 418-428.
Office Action dated Mar. 29, 2016 in Japanese Patent Application No. 2015-504768 filed Apr. 8, 2013.
Notice of Allowance dated Jul. 26, 2016 for Japanese Patent Application No. 2015-504768 filed Apr. 8, 2013.

* cited by examiner

300

| Type | Name | Description |
|---|---|---|
| Ichdata | ichdata | see FIG. 4 |
| u64 | ino | inode number |
| u64 | size | file size in bytes |
| u32 | blksize | block allocation |
| u32 | nlink | number of hard links |
| u32 | uid | owner user id |
| u32 | uid | owner group id |
| u64 | atimesec | time of last access (seconds part) |
| u64 | mtimesec | time of last data modification (seconds part) |
| u64 | ctimesec | time of last file status change (seconds part) |
| u32 | atimensec | time of last access (nanoseconds part) |
| u32 | mtimensec | time of last data modification (nanoseconds part) |
| u32 | ctimensec | time of last file status change (nanoseconds part) |
| u32 | mode | type and permissions |
| u32 | rdev | device type |
| Smash | chash | **Content hash** – smash of the content this inode describes |
| Smash | chash | **Extended attributes hash** – smash of extended attributes object |

POSIX attributes 310

FIG. 3 lchdata

400

| Type | Name | Description |
|---|---|---|
| u64 | generation | snapshot generation count (for original version) |
| u64 | revgen | snapshot of revision (when rewritten for history thining) |
| u64 | snaptime | start time for this generation of this version, as 64-bit NS from UTC |
| u32 | snaptag | enumeration value identifying the operation that created this snapshot |
| Smash | ohash | **old hash** – the smash of the previous version of this node. **zznash** if there is no previous version |
| Smash | mhash | **merge hash** – alternate history this inode was derived from (including thinned out history) |
| Smash | uuid | **Universally unique identifier** – inherited by all versions of this object through history |

410 (rows generation–snaptag)

420 (rows ohash–uuid)

FIG. 4

CONTENT BASED ORGANIZATION OF FILE SYSTEMS

CROSS-REFERENCE TO RELATED APPLICATIONS

The present application claims benefit of U.S. provisional application No. 61/935,618 filed on Feb. 4, 2014. The disclosure of the aforementioned application is incorporated herein by reference for all purposes.

TECHNICAL FIELD

This disclosure relates generally to data processing, and more specifically, to methods and systems for organization and management of computer file systems.

BACKGROUND

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

In computer systems, data kept on storage devices like hard disks is organized as a file system. Usually, the file system has a tree structure and consists of a root directory, directories, subdirectories, and files. Each object in the file system, i.e. a file or a directory, has an Object Identifier (ID), and a special record called an "Inode" holding attributes associated with the object such as, for example, file size in bytes, block allocation, owner user ID, owner of group ID, time of last modification, and so forth.

In content addressable file systems, the object ID is created by running a mathematical function over the user or metadata content. In traditional file systems, the object ID is typically chosen from a list of unused identifiers.

Most file systems keep only the latest versions of files. If a user wishes to keep older versions of files or directories the user must save them manually or use special versioning software to keep track of the versions of different versions. Backing up of data may be regularly performed by an administrator and a user needs to contact the administrator in order to get an older version of a file.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The technology described herein is a method of organization and management of a file system in a computer storage device. The file system is constructed on top of a content addressable distributed object store.

According to an example embodiment, the method includes associating a record with user content. The record can include attributes associated with the user content. The attributes can include at least a content hash associated with an object in the content addressable object store. The method can allow dividing the user content into a plurality of data objects. Each data object has a predetermined minimum size. The method includes generating, for each data object of the plurality of the data objects, respective data object hashes. The data object hashes are functions of respective data object contents associated with the data objects. The method further includes determining, based on the data object hashes, the content hash.

In some embodiments, determining the content hash includes calculating a number of objects in the plurality of the data objects. If the number of the objects is one, the content hash is set to the data object hash. If the number of the objects is more than one, a pointer tree is generated based on the data object hashes. The generating of the pointer tree includes grouping the data object hashes into a plurality of pointer objects. The pointer objects are assigned as leaves of a layer in the pointer tree. If the layer includes more than one leaf, a next layer of the pointer tree is constructed. The construction of the next layer includes generating pointer hashes for each of the pointers objects. The pointer hashes are functions of respective pointer object contents associated with the pointer objects. The construction of the next layer includes grouping the pointer hashes into a plurality of further pointer objects. The construction of the next layer includes assigning the further pointer objects as leaves of a further layer in the pointer tree. The generating of the pointer hashes, the grouping the pointer hashes, and assigning the further pointer objects are repeated until a final layer having one leaf is received. The leaf of the final layer is assigned as a root of the pointer tree. A root hash is computed based on the content of the root of the pointer tree and the content hash of the record is set to the root pointer hash.

In some embodiments, the depth of the pointer tree is determined by the following equation: $MaxFileSize = BLKSZ \times (truncate(BLKSZ \div SMASHSZ))^{depth}$. MaxFileSize is a size of the content entity. BLKSZ is the predetermined minimum size. SMASHSZ is a size of the content hash. The truncate is a function of a real number returning integer part of the real number.

In some embodiments, the user content includes one or more of the following: a data file and a folder.

In some embodiments, the folder includes at least one folder entry associated with a further record. The further record is associated with further user content. The folder entry includes at least one of the following: a type of entry associated with a type of the further user content, a name associated with the further user content, a length of the name associated with the further user content, and an attribute of the entry associated with a further record. The further record hash is generated based on the attributes of the further record.

In some embodiments, the folder includes one or more entries associated with further records, each of the further records being associated with a unique time version of the user content.

In some embodiments, the attributes of the record include a previous record hash. The previous record hash is generated based on a content associated with attributes of a previous record. The previous record is associated with a respective previous version of the user content.

In some embodiments, the method further includes, in response to a change in the user content, at least partially regenerating the pointer tree associated with the user content. The method includes generating a further record and setting the content hash of the further record to a pointer hash associated with the root of the regenerated pointer tree. The method also includes computing a record content hash based on content associated with the attributes of the record. The method includes setting the previous record hash of the new record to the record content hash.

In some embodiments, the method further includes writing the data object to a cluster storage. The writing of the data object includes receiving the data object and a type of the data object. The data object hash is computed. Physical nodes of the cluster storage on which to store a copy of the data object are determined. On each of the determined physical nodes the data object hash is looked up in the content addressable object store to obtain data object metadata. The metadata includes at least a disk identifier and a location within the disk. If the data object hash is not found, then a copy of the data object is written to the node and the content addressable object store is updated with new metadata associated with the data object.

In some embodiments, the method further includes writing a file to the cluster storage. The writing of the file includes splitting the file into file data objects and computing file data object hashes for the file data objects. A file pointer tree is generated by inserting the file data object hashes into a file pointer object associated with a leaf of the file pointer tree. If the file pointer object is full or all file data objects have been processed, a file pointer hash for the file pointer object is computed and the file pointer hash is inserted into a parent file pointer object. The computing the file pointer hash for the file pointer object is repeated until the file pointer tree is constructed. The writing of the file further includes inserting a file pointer hash of the root of the file pointer tree into the content hash attribute of a file record. Thus, the file record is associated with the file. The attributes of the file record are updated with at least a file size and a timestamps. A record content hash is computed based on attributes of the file record. The file data objects, the file pointer objects, and the file record are written to the cluster storage. An indication of one of a success and a failure of the writing is returned.

In some embodiments, the method for organizing and managing a file system on top of a content addressable object store includes reading the data object from a cluster storage. The reading the data object includes receiving the data object hash. The reading the data object also includes determining a set of physical nodes of the cluster storage. The physical nodes are ordered from the most likely to the least likely to include a copy of the data object. For each ordered physical node, the data object hash in the content addressable object store is looked up. If and when the data object hash is found, the reading the data object further includes receiving, based on the data object hash, data object metadata. The object metadata includes a disk identifier and a location within the disk. A copy of the data object is then read from the node using the data object metadata.

In some embodiments, the method can further include reading a file from the cluster storage. The reading the file includes receiving a record content hash of a file record associated with the file. The file record is read from the cluster storage by applying the reading process. The process includes determining a root pointer hash associated with the root of a file pointer tree by fetching the content hash of the file record. The reading includes descending the file pointer tree starting with the root to fetch file pointer hashes in child leaves of the file pointer tree. File data objects associated with the file pointer hashes can be read by applying the reading process. The file data objects are reassembled into sequential file data. The reading the file from the cluster storage can conclude with returning the sequential file data.

According to another example embodiment of the present disclosure, the steps of the method for organizing and managing a file system on top of a content addressable object store are stored on a machine-readable medium comprising instructions, which, when implemented by one or more processors, perform the recited steps.

Other features of the present method include providing a tracking history of versions for all the files and directories on the fly. Therefore, older version of the files and directories, including the root directory, are available to a user at any time.

BRIEF DESCRIPTION OF THE DRAWINGS

Embodiments are illustrated by way of example and not limitation in the figures of the accompanying drawings, in which like references indicate similar elements.

FIG. 3 displays a table of attributes describing an Inode entry in a file system.

FIG. 4 displays a collection of the attributes of an Ichdata parameter.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

The technology described herein allows for organizing and management of a file system built on top of a content addressable distributed object store. Each visible object in the file system can be associated with a chain of object IDs, each of which corresponds to a version of the object at a given point of time. Therefore, the object store can be said to provide “snapshots” of the file system at various points in time. The file system can keep all versions of all files and run a garbage collection process to discard versions that are no longer needed.

According to an example embodiment, the method includes associating a record (also referred to as an inode object) with user content. The record can include attributes associated with the user content. The attributes can include at least a content hash associated with an object in the content addressable object store. The example method can allow dividing the user content into a plurality of data objects. Each data object has a predetermined maximum size. The method can include generating, for each data object of the plurality of the data objects, respective data object hashes. A data object hash is a function of respective data object content associated with the corresponding data object. The method can include determining, based on the data object hashes, the content hash.

Figure 1:
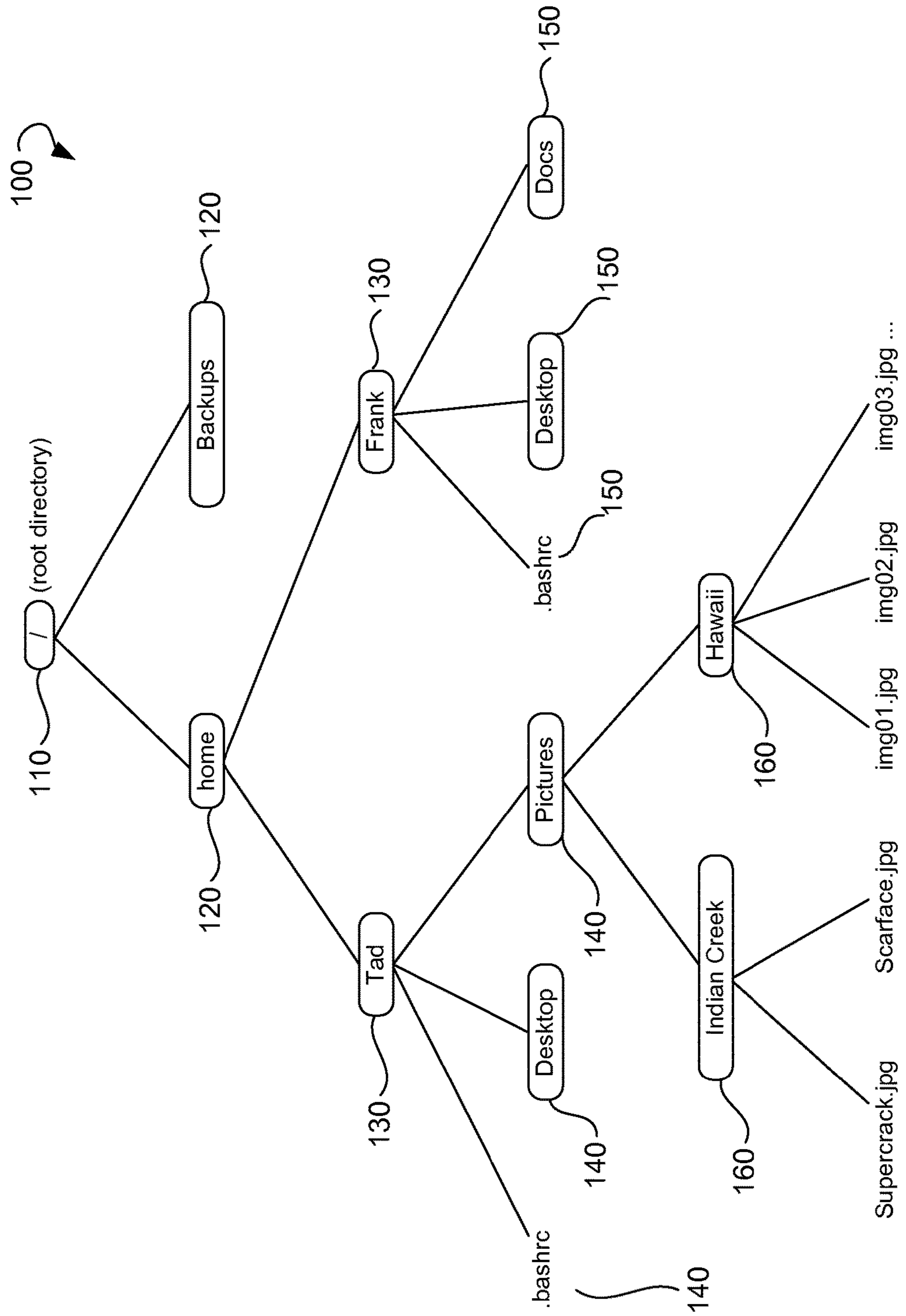
FIG. 1 illustrates an example of content in a file system.

An example of a file system 100 is shown in FIG. 1. The file system can be seen as a hierarchical tree. The root node of the tree corresponds to the root directory 110, i.e., the root folder of the file system, the only folder that is not a child of any other folder. The child nodes 120, 130, 140, 150, 160 of the given node can be a file or a folder. The file system can utilize a POSIX semantic.

All object IDs are computed based on the content of the object. If the object content changes, the object ID may also change and have a new object ID. The change of an object may also cause a change in its parent’s object ID. The change propagates all the way to the root of the tree representing the file system 100. This way, a unique object ID can be generated for each version of the file system 100.

Figure 2:
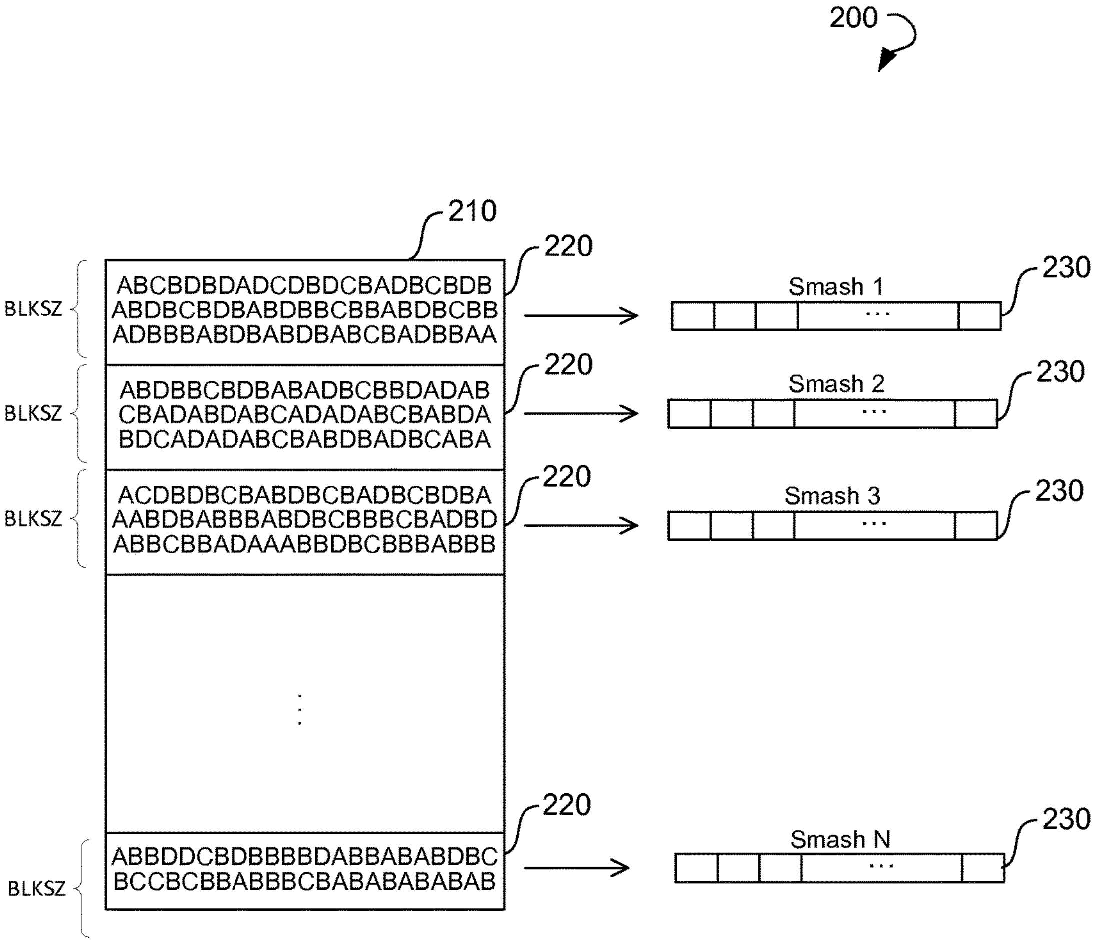
FIG. 2 illustrates generation of smart hashes for data objects of a given file.

The key attributes in each object ID are parameters of type Smash, which stands for smart hash. The smart hashes are also referred to as Object Identifiers. FIG. 2 illustrates an example representation 200 of calculating Smash object IDs for a file.

The file 210 is split into objects 220 of BLKSZ size. Each of these objects 220 is an input object for a hash function returning a parameter of a Smash type.

The hash function may have several requirements. The function should generate a unique Smash output for every possible input object. If two input objects differ by even one bit, the hash function should, with high probability, generate two different Smash values.

The hash function always generates Smashes 230 that are of the same length of bytes. The length of Smashes 230 is known as SMASHSZ. The maximum length of a data object is known as BLKSZ. These are predetermined parameters for the file system. For example, Smashes of 20 bytes in length and BLKSZ value of 32 KB can be used. There must be very small probability that two different input objects of 32 KB length can result in the same Smash value of 20 bytes in length.

The output of the hash function should be fairly evenly distributed in the hash space. Every time the hash function is given the same input, it must generate the same output.

There is a special Smash value called zzhash. It is used to represent something that does not exist.

For each object visible to a user in the file system there is at least one entity called Inode. The Inode holds all the information required to represent a file or directory in the file system. FIG. 3 shows a structure of the Inode 300. Most of the attributes 310 of the Inode are regular parameters defined by the POSIX standard such as an owner ID, group ID, size of file in bytes, and so forth. Some custom attributes can be added such as chash, xhash, and ichdata.

The chash stands for content hash. The chash is a parameter of a Smash type, may contain Smash for directory data object, directory pointer object, data object, pointer tree object, or zzhash.

The xhash is an extended attributes hash. It may contain a Smash parameter for extended attribute data object, extended attribute pointer object, or zzhash.

A structure of the Intentional Chained History Data (ichdata) 400 is shown in FIG. 4. This is a set of attributes 410 utilized in a mechanism that is responsible for creating and tracking the history of mutable objects out of immutable objects in the data store. The set of parameters include a generation, which is a snapshot generation count, revgen, which is a revision count within that snapshot, snaptime, which is a time the snapshot was created, snaptag, which is an enumeration value that indicates which file system operation caused that snapshot, such as creation, deletion, writing to the file, renaming the file, and so forth.

The ichdata 400 may also include three parameters 420 of the Smash type.

a. ohash, which stands for old hash, holds the Smash for the previous version of this Inode. ohash is equal to zzhash if there is no previous version of the object.
b. Mhash or merge hash represents the alternate history this node was derived from. It may be equal to zzhash if there is no such alternate history.
c. Uuid or Universally Unique Identifier is a parameter inherited by all versions of this object throughout its history. The uuid parameter is generated when the Inode for this particular file or directory is first created.

Inode has only one chash parameter. When the file size is less or equal to BLKSZ predefined system parameter, one need just apply a hash function to the file in order to generate the corresponding Smash. However, a majority of files in the file system, as well as directories can grow bigger than BLKSZ. When the size of the file or directory is larger than BLKSZ, then the file or directory is represented via a pointer tree.

Figure 5:
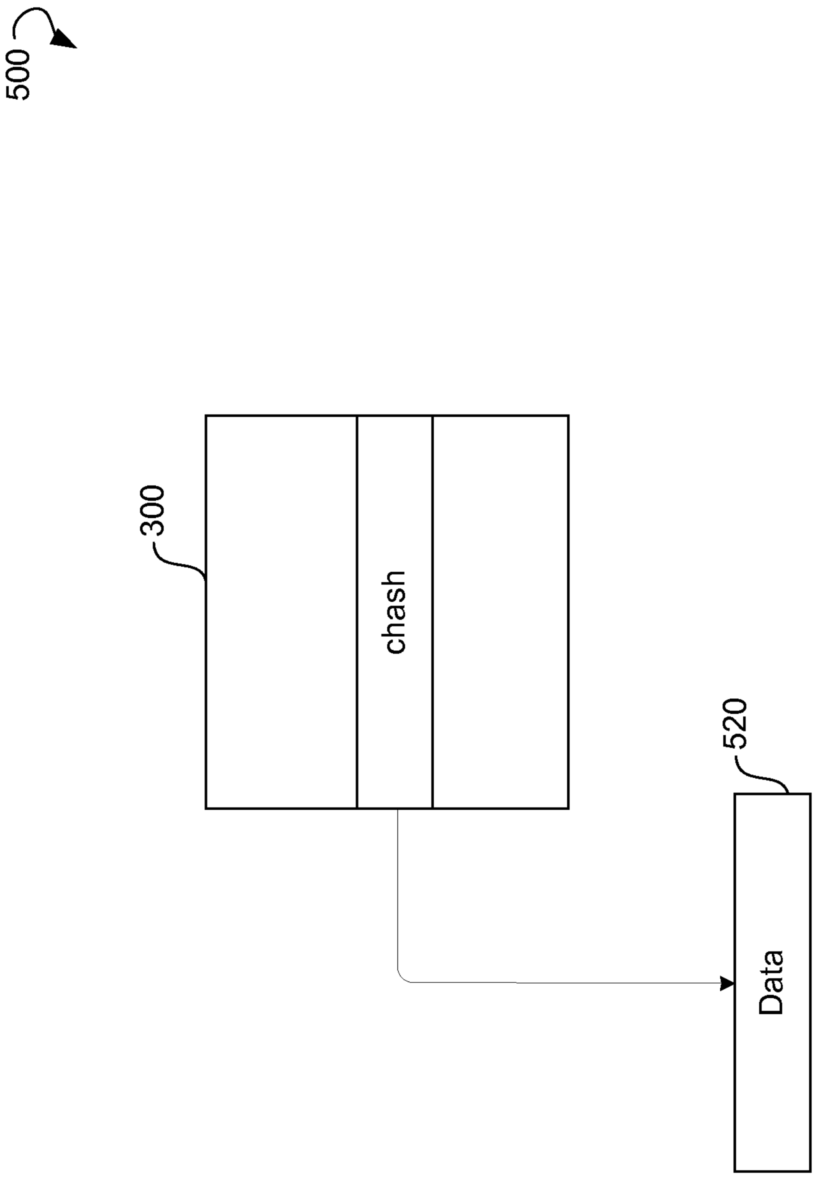
FIG. 5 illustrates an Inode pointing directly to file data.

FIG. 5 illustrates a representation 500 of an Inode 300 pointing to a file of size smaller or equal to BLKSZ shown as data object 520. The chash parameter in the Inode is the Smash calculated for the file.

Figure 6:
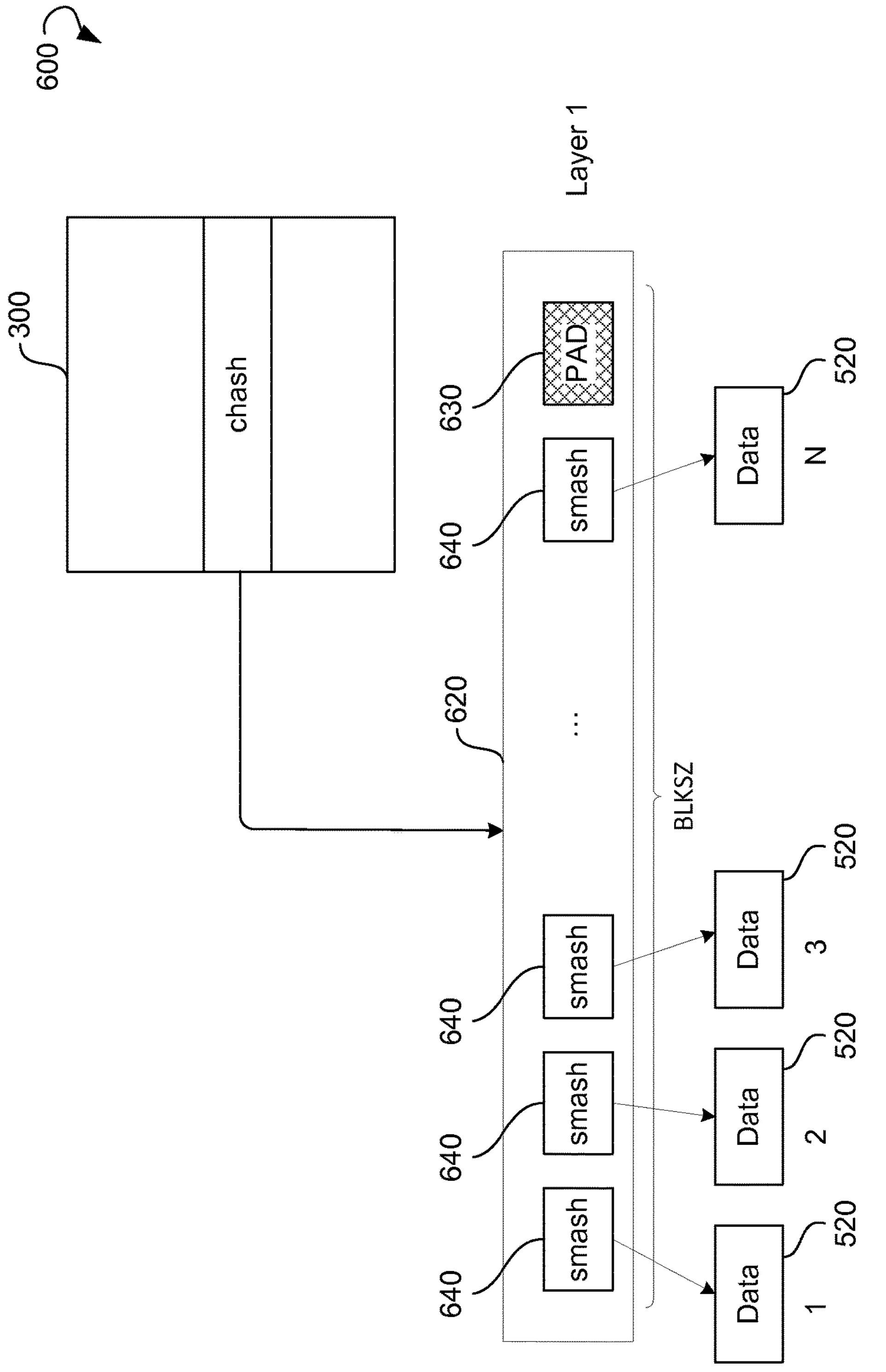
FIG. 6 illustrates one layer pointer tree for representing a file or a directory.

FIG. 6 illustrates a representation 600 of an Inode 610 corresponding to a file of size larger than BLKSZ and corresponding one-layer pointer tree representing the file. The chash parameter in the Inode 300 is the Smash of the object containing in turn a layer 1 of Smashes 640. The Smashes 640 in the layer 1 are calculated for the objects of the file data 520, which can be seen as leaves in the pointer tree. Each data object 520 is of a size BLKSZ. The last data object 520 may be of size BLKSZ or less. An object containing object hashes is referred to as a pointer object 620.

Each pointer object 620 may thus hold up to N=truncate (BLKSZ÷SMASHSZ) hashes. For example, when BLKSZ is 32 KB and SMASHSZ is 20 bytes, then the pointer tree with one layer of Smashes can represent files up to 53,673,984 bytes in size.

Figure 7A:
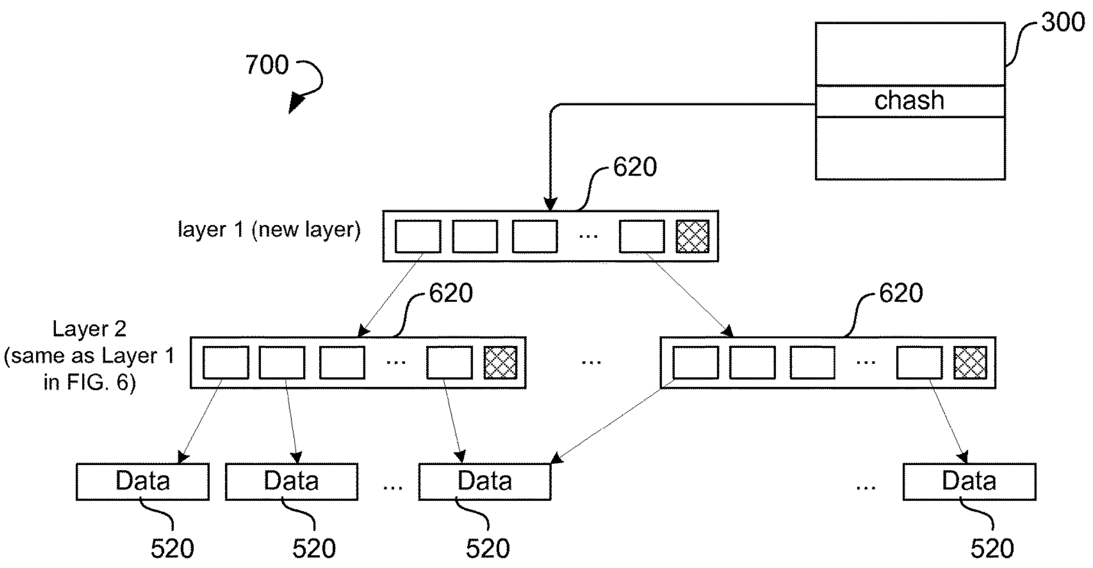
FIG. 7A illustrates a two-layer pointer tree for representing a file or a directory.

FIG. 7A illustrates a two-layer pointer tree 700. The pointer object 620 in layer 1 holds Smashes of other pointer objects. Each pointer object 620 in the second layer contains Smashes 640 for the data objects 520. For example, when BLKSZ is 32 KB and SMASHSZ is 20 bytes a two-layer pointer tree can represent files up to about 83 GB in size.

Figure 7B:
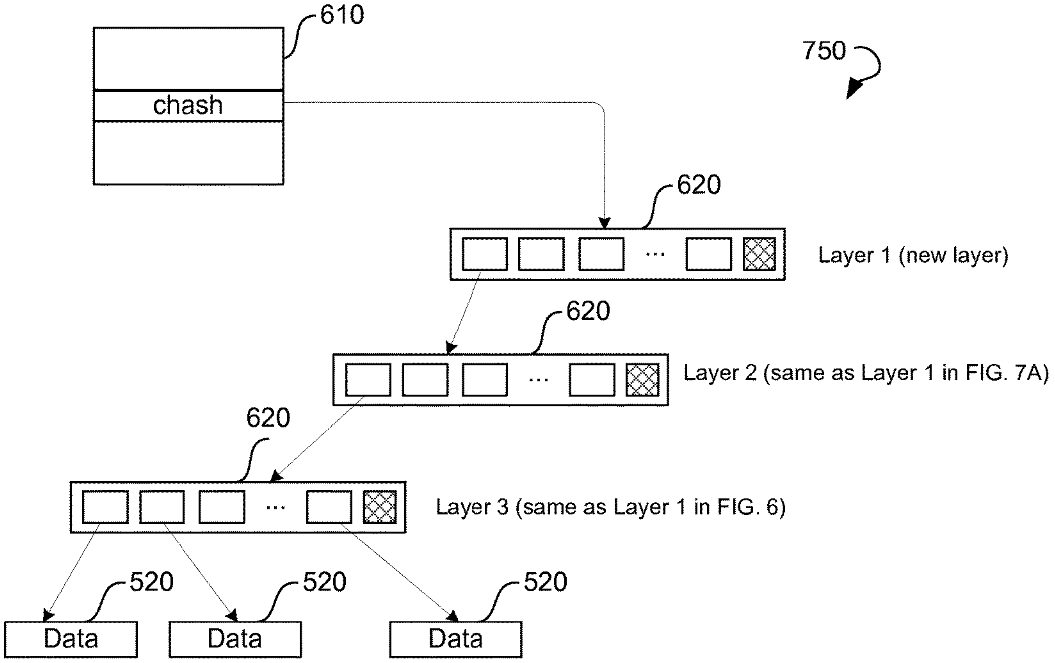
FIG. 7B illustrates a three-layer pointer tree for representing a file or a directory.

FIG. 7B shows a three-layer pointer tree 750. In contrast to the two-layer pointer tree 700 of FIG. 7A, the three-layer pointer tree 750 contains an additional layer of pointer objects 620. For example, when BLKSZ is 32 KB and SMASHSZ is 20 bytes the three-layer pointer tree 750 can address files up to about 134 TB in size.

The maximum size of a file for any given depth of a pointer object tree can be calculated as follows: $\text{MaxFileSize}=\text{BLKSZ}\times(\text{truncate}(\text{BLKSZ}\div\text{SMASHSZ}))^{depth}$.

The representation of data using a pointer tree helps to quickly propagate changes from the file data through Smashes in the layers back to Inode. The same mechanism of pointer trees can be used to represent large directories.

Figure 8:
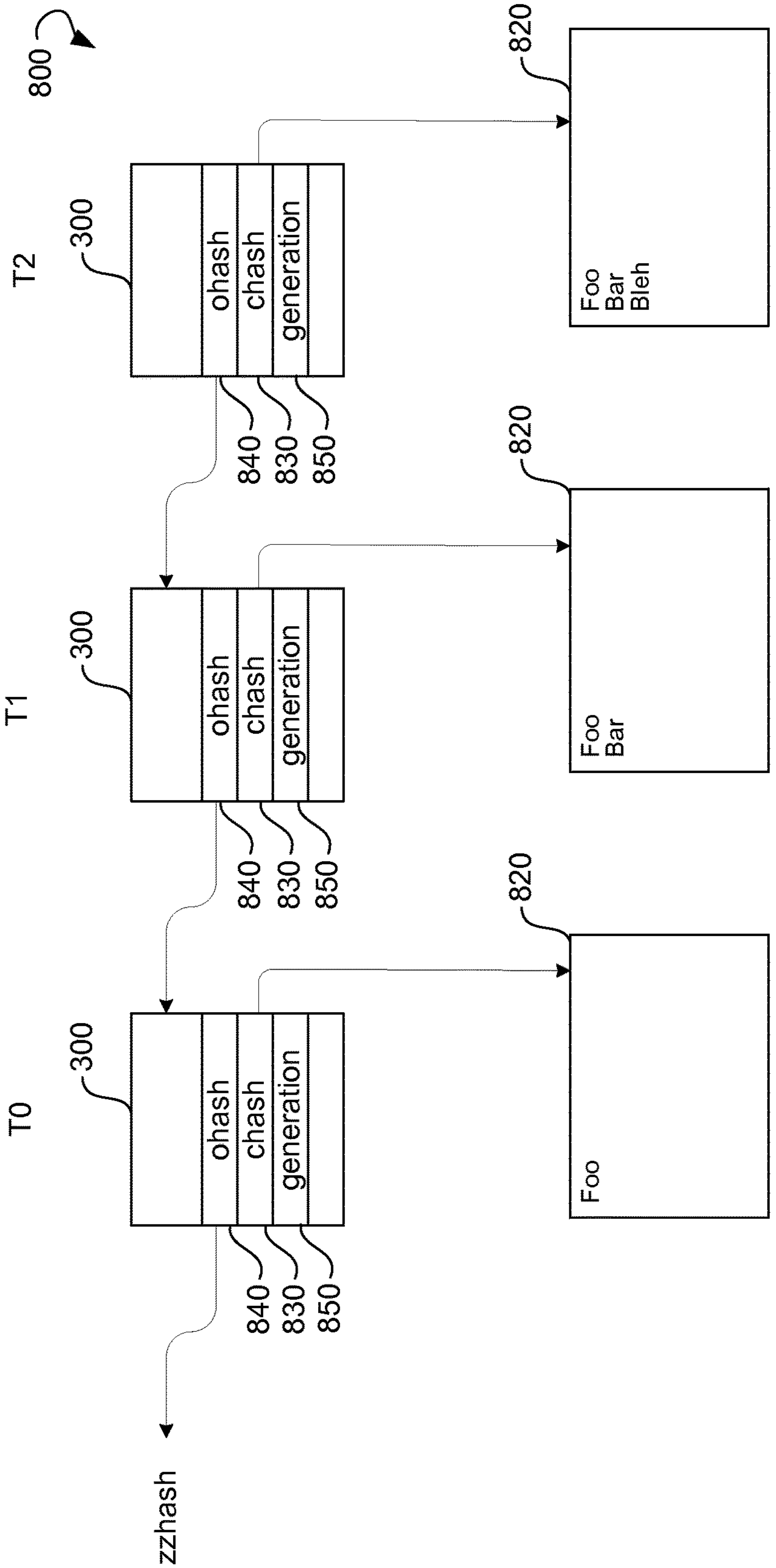
FIG. 8 illustrates a chain of linked Inodes associated with versions of a file.

FIG. 8 illustrates a list 800 of connected Inodes 300 describing one entity, file or directory shown as a file 820. The Inodes 300 correspond to points in time T0, T1, T2, and so on, at which modification to the entity was made. The new Inode is created and added to the top of the chain each time the corresponding content is modified. The generation attribute 850 of the new Inode may increase by one.

The chash parameter 830 of each Inode 300 contains the Smash of the entity or the entity's pointer tree at the given point of time. The ohash parameter is the Smash of the Inode 300 corresponding to a previous point of time. The ohash parameter of Inode 300 of first point of time is directed to zzhash since there is no previous version for this entity. The ohash parameters 840 are linking Inodes 300 for a given entity constructing a back in time chain of "snapshots" for a given entity. The chash parameter 830 of each Inode 300 in the chain points to its version of data. This type of connection allows a search through different versions of the data. A garbage collector can be set up to walk down this chain and decide which of these versions can be deleted. An example of a method that performs the garbage collection is described in U.S. Provisional Patent Application No. 61/834,097, entitled "Hybrid Garbage Collection," filed Jun. 12, 2013, which is incorporated herein by reference.

Figure 9:
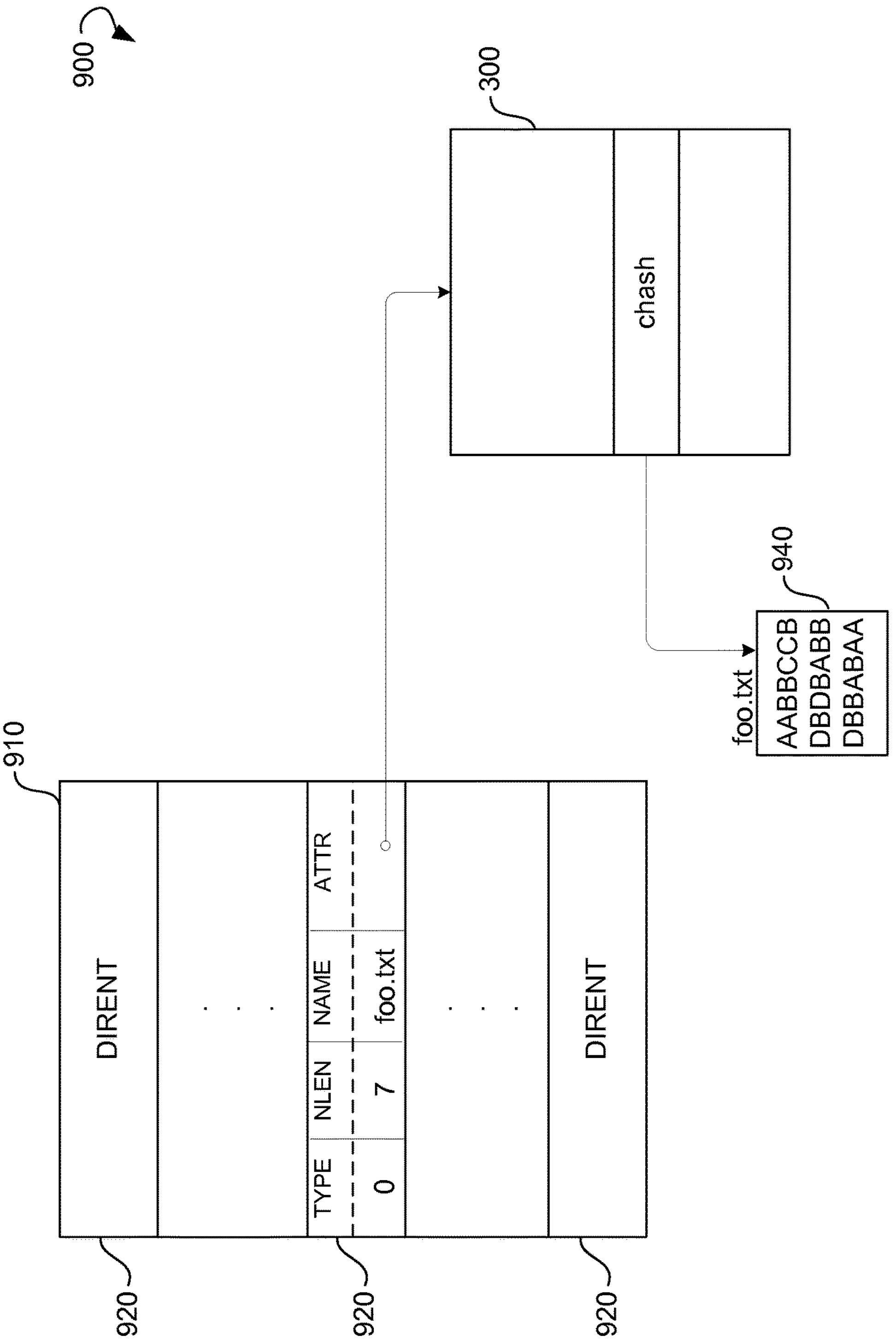
FIG. 9 illustrates the structure of a directory data object and a connection of a directory entry to Inode and a corresponding file data object.

FIG. 9 illustrates an example representation 900 of the content of a directory 910. The directory data consist of a set of directory entries 920. A directory entry 920 is a record of variable size including the following attributes: a type of entry, length of entry's name, name of entry, and attribute specified by the type. The type of the directory entry can have at least two possible values: 0 and 1.

The directory entry of type 0 identifies an Inode 300. The name field in the directory entry 920 holds the name of the file 940 or directory to which the Inode represents. The specified attribute in the directory entry is the Smash of the Inode 300.

Figure 10:
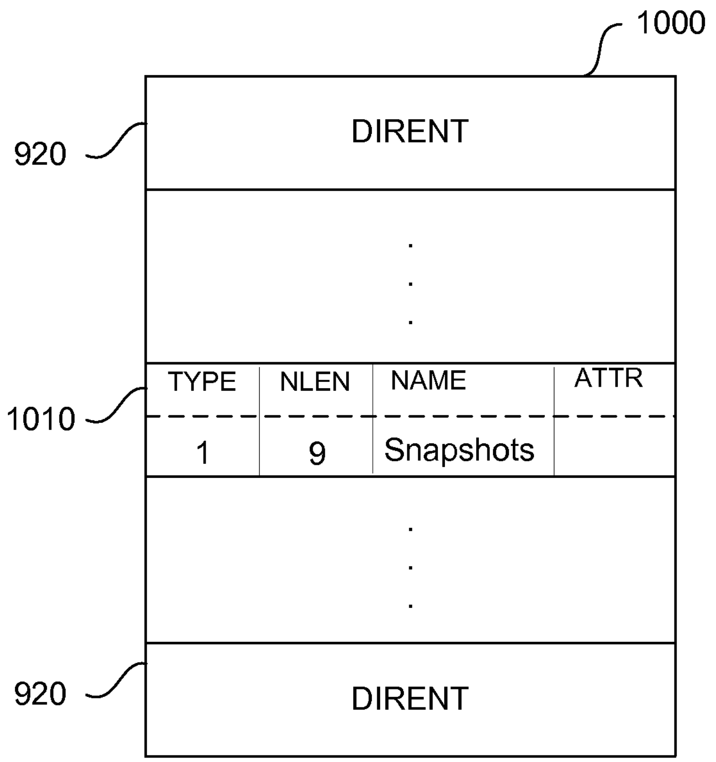
FIG. 10 shows an example of directory data with a directory entity of type 1.

For the directory entity of type 1, the name file identifies the root of the virtual snapshots tree. A specific attribute of the directory entry is not used in this case. The user may see the name of the virtual snapshots tree as a subdirectory. FIG. 10 shows an example of the directory data 1000 with directory entity 1010 of type 1.

Figure 11:
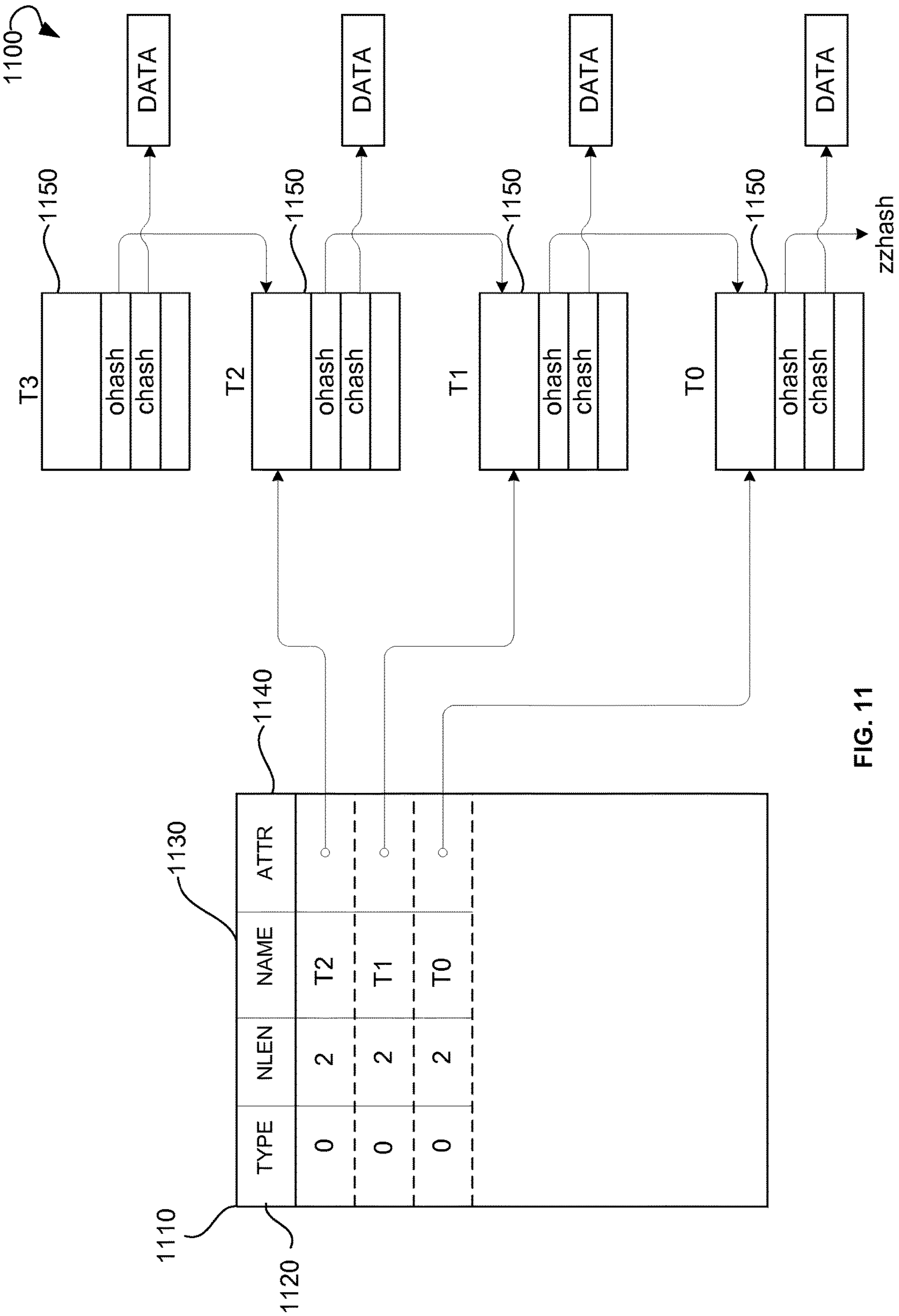
FIG. 11 illustrates a scheme of a virtual directory for snapshots and mechanism allowing a user to have access to older versions of a file or a directory.

A virtual directory is generated when a user desires to view the snapshots of a file system. FIG. 11 shows the structure 1100 of the virtual directory. The virtual directory data 1110 of the virtual directory may contain directory entries 1120 of type 0, and names 1130 can be represented by timestamps associated with the creation of the snapshots. The hash attribute 1140 of the directory entries may contain Smashes of the Inodes 1150 corresponding to the timestamps. Through these Inodes 1150, a user can have access to corresponding older versions. Further details of methods for viewing snapshots of a file system are described in U.S. patent application Ser. No. 14/512,299, entitled "Hierarchical Data Archiving," filed Oct. 10, 2014, which is incorporated herein by reference.

Figure 12:
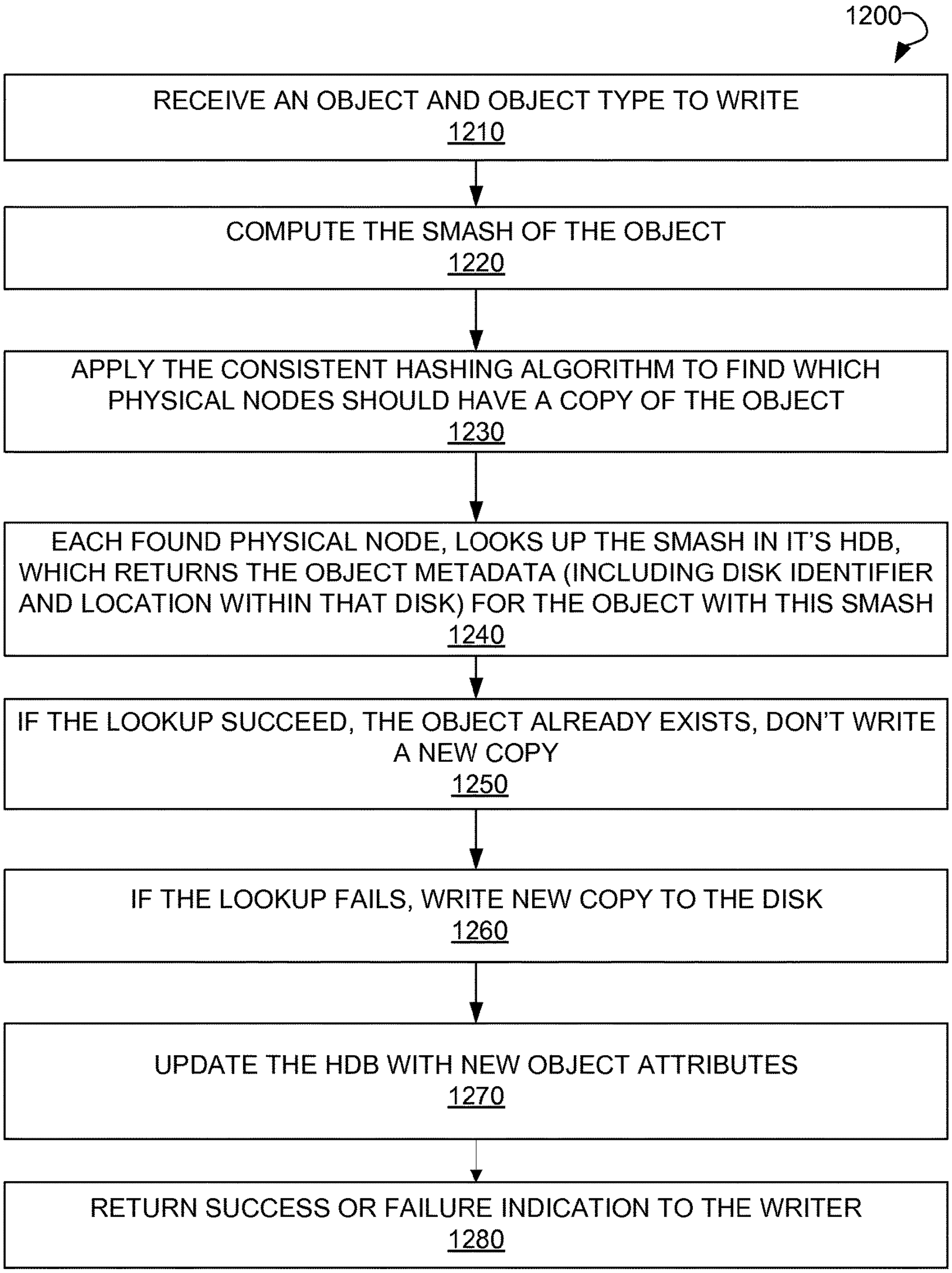
FIG. 12 is a process flow diagram showing a method for writing an object.

FIG. 12 is a "write object" process flow diagram showing a method 1200 for writing an object to the storage cluster. The method 1200 commences in step 1210 with receiving an object and object type to write. In step 1220, a Smash of the object is computed. In step 1230, physical nodes, which should have a copy of the object, are found by applying the Consistent Hashing Algorithm. The Consistent Hashing Algorithm is described in U.S. patent application Ser. No. 13/441,592, entitled "Consistent Ring Namespaces Facilitating Data Storage and Organization in Network Infrastructures," filed Apr. 6, 2012, which is incorporated herein by reference. In step 1240, the object and Smash is sent to each physical node determined in previous step 1230. Each node performs a lookup for Smash in its Hash Database (HDB). The lookup may be performed using a method described in U.S. patent application Ser. No. 13/441,715, entitled "Cryptographic Hash Database," filed Apr. 6, 2012, which is incorporated herein by reference. The lookup returns object metadata, including a disk identifier and a location on the disk for the object with this Smash. In step 1250, if the lookup succeeds, a new copy of the object is not written since the object already exists. If the lookup fails, then in step 1260, a new copy of the object is written to the disks and nodes in the cluster as determined by the consistent hashing algorithm at step 1230. A method for writing an object to the disk is described in U.S. patent application Ser. No. 14/055,662, entitled "Forward-Only Page Data Storage Management," filed Oct. 16, 2013, which is incorporated herein by reference. In step 1270, each node that wrote the object updates its HDB with new attributes of the object. A method for updating the HDB is described in U.S. patent application Ser. No. 13/441,715 (full citation above). In step 1280, a success or failure indication is returned to the writer.

Figure 13:
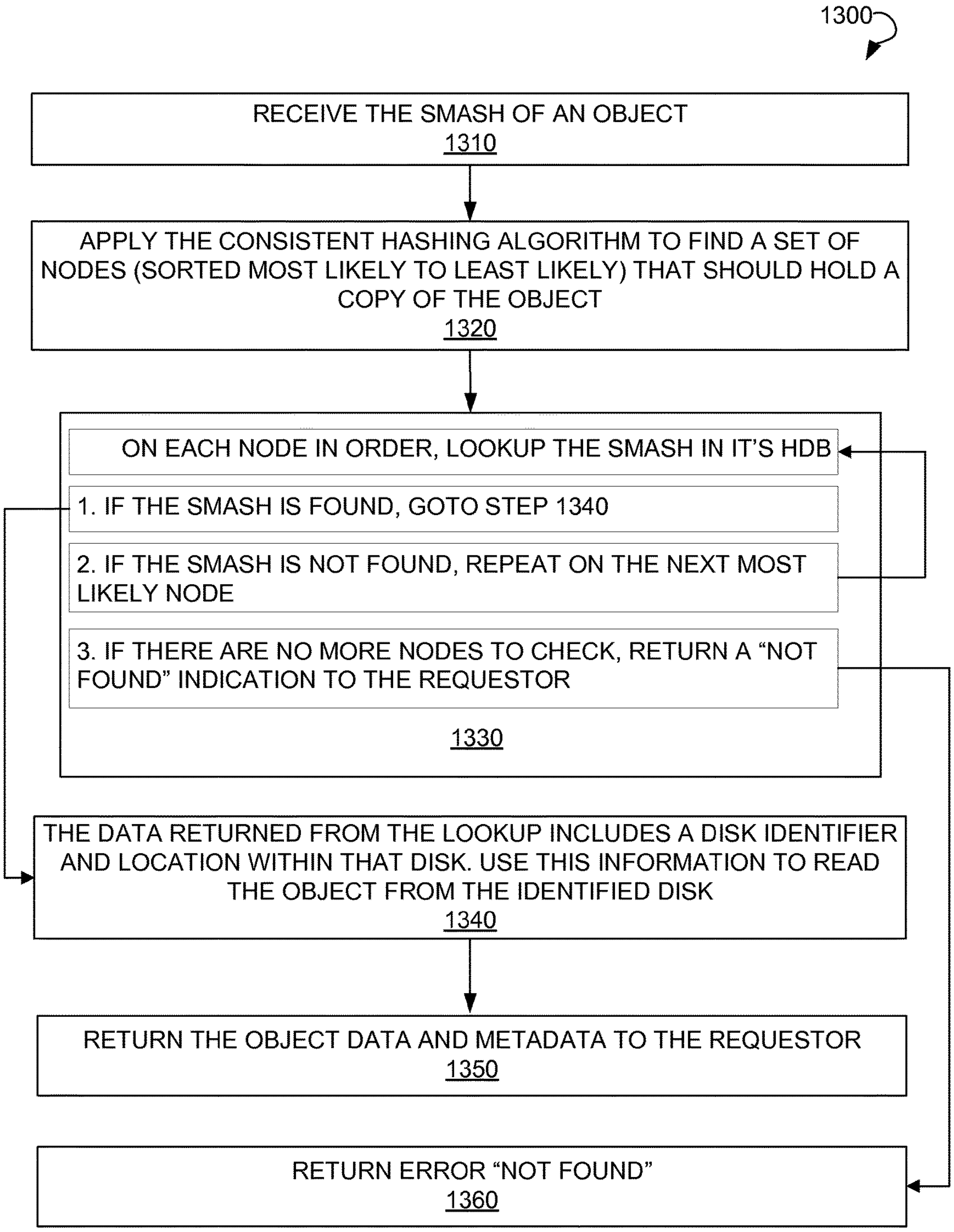
FIG. 13 is a process flow diagram showing a method for reading an object.

FIG. 13 is a "read object" process flow diagram showing a method 1300 for reading an object from the storage cluster according to an example embodiment. The method 1300 commences in step 1310 with receiving the Smash of an object. In step 1320, the Consistent Hashing Algorithm as described in U.S. patent application Ser. No. 13/441,592, "Consistent Ring Namespaces Facilitating Data Storage and Organization in Network Infrastructures," filed Apr. 6, 2012, which is incorporated herein by reference, is applied to find a set of nodes sorted from the most likely to least likely to hold a copy of the object. In step 1330, on each node the Smash of the object is looked up in the HDB belonging to that node. A method for searching the HDB is described in U.S. patent application Ser. No. 13/441,715 (full citation above). If a record for the Smash is found, proceed with step 1340 of the method 1300. If the Smash is not found, the lookup in step 1330 is repeated on the next most likely node. If all nodes have been searched without finding the object, a "not found" indication is returned to the requestor. In step 1340, the object is read from disk using a disk identifier and a location on the disk obtained from the data received by the lookup in step 1330. A method for reading an object from disk is described in U.S. patent application Ser. No. 14/055,662 (full citation above). In step 1350, the object data and metadata are returned to the requestor. It should be noted that this algorithm can be executed concurrently on one or more nodes.

Figure 14:
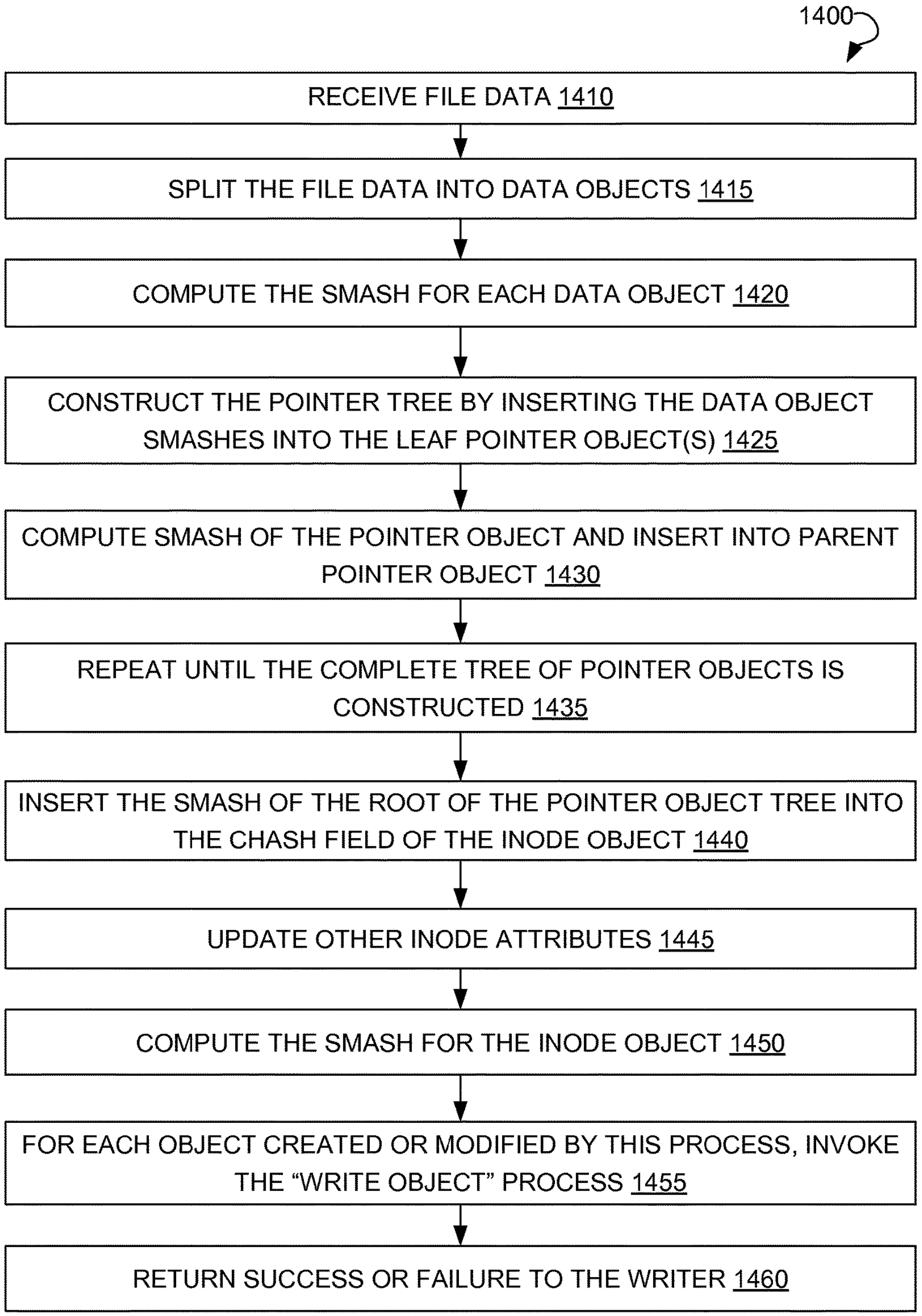
FIG. 14 is a process flow diagram showing a method for writing a file.

FIG. 14 is a process flow diagram showing an example method 1400 for writing a file to the storage cluster. The method 1400 commences in step 1410 with receiving file data from a writer. In step 1415, the file data is split into data objects, each data object being of size BLKSZ except for the last chunk, which can be less than BLKSZ. In step 1420, a Smash is computed for each data object. In step 1425, a pointer tree is constructed by inserting the data object Smashes into the leaf pointer nodes as shown in FIGS. 5, 6, 7A, and 7B. In step 1430, if the pointer object is full or all data objects have been processed, a Smash for the pointer object is computed and inserted into the parent pointer object. In step 1435, the step 1430 is repeated until the complete tree of pointer objects is constructed. In step 1440, the Smash of the root of the pointer object tree is inserted into the chash field of the Inode object. In step 1445, other Inode attributes, like file size, timestamps, and so on, are updated. In step 1450, the Smash of the Inode object is computed. In step 1455, for each object created or modified by this process, the "write object" process as described in FIG. 12 is invoked. Finally, in step 1460, a success or failure is returned to the writer.

Figure 15:
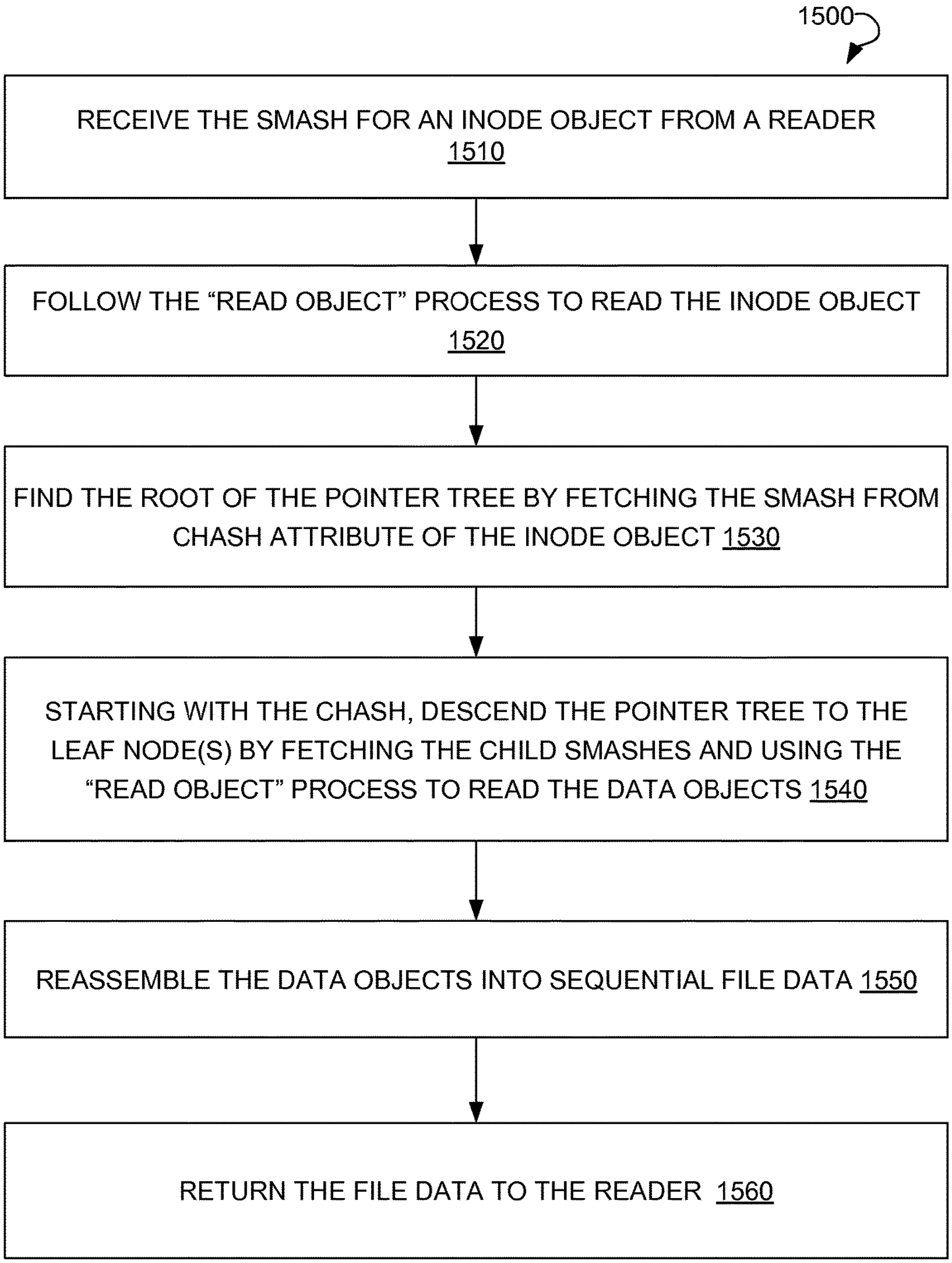
FIG. 15 is a process flow diagram showing a method for reading a file.

FIG. 15 is a process flow diagram showing a method 1500 for reading a file from the storage cluster. The method 1500 commences in step 1510 with receiving a Smash for an Inode object from a reader. In step 1520, a "read object" process described in FIG. 13 is used to read the Inode object. In step 1530, the root of the pointer tree is found by fetching the Smash from the chash attribute of the Inode object. In step 1540, starting with the chash, a pointer tree is descended to the leaf node(s) by fetching the child Smashes and applying the "read object" process described in FIG. 13 to read the objects. In step 1550, the data objects are reassembled into a sequential file data. In step 1560, the file data is returned to the reader.

Figure 16:
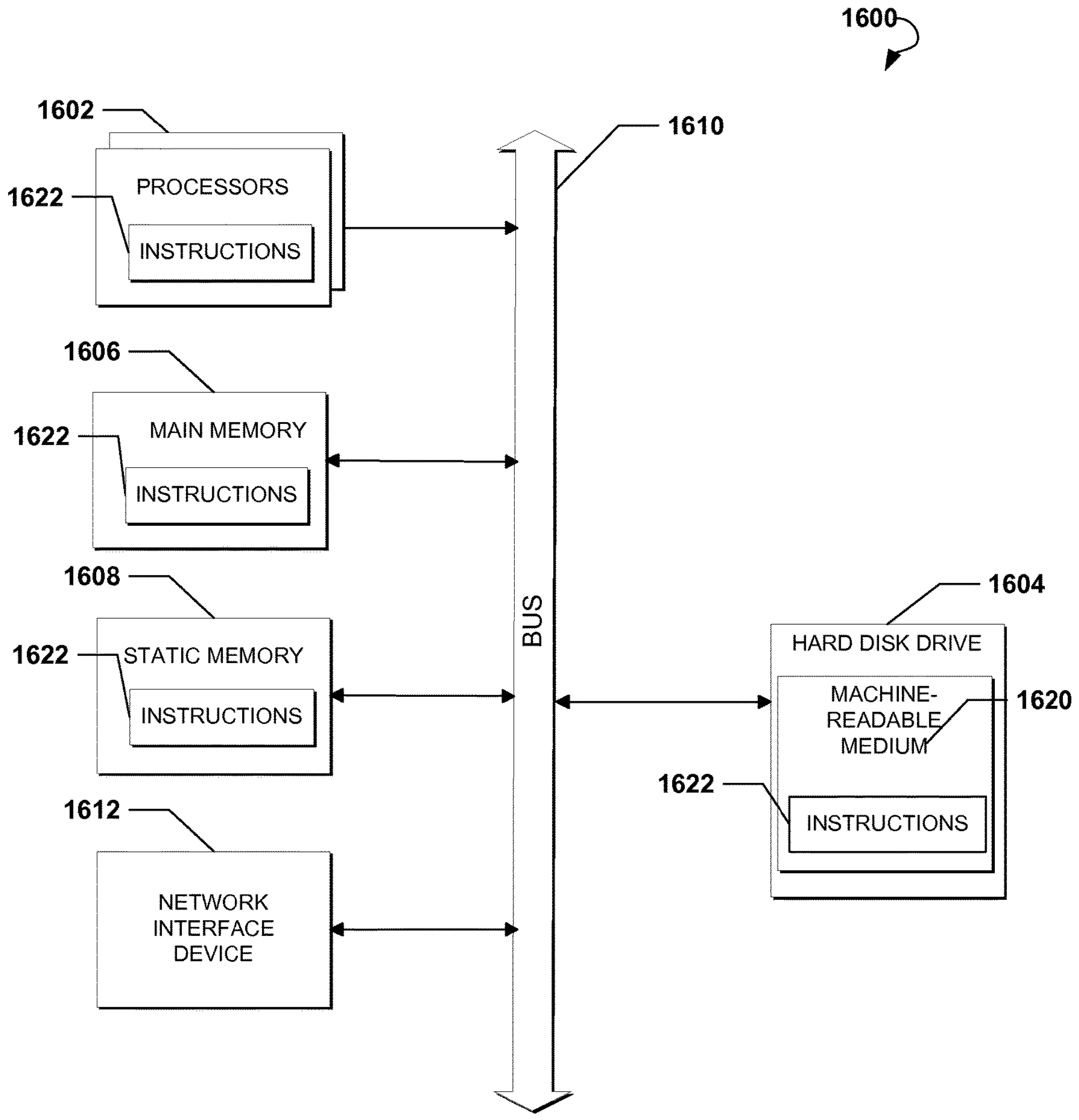
FIG. 16 shows a diagrammatic representation of a computing device for a machine in the example electronic form of a computer system, within which a set of instructions for causing the machine to perform any one or more of the methodologies discussed herein can be executed.

FIG. 16 shows a diagrammatic representation of a computing device for a machine in the exemplary electronic form of a computer system 700, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set-top box (STB), a PDA, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor or multiple processors 1602, a hard disk drive 1604, a main memory 1606 and a static memory 1608, which communicate with each other via a bus 1610. The computer system 1600 may also include a network interface device 1612. The hard disk drive 1604 may include a computer-readable medium 1620, which stores one or more sets of instructions 1622 embodying or utilized by any one or more of the methodologies or functions described herein. The instructions 1622 can also reside, completely or at least partially, within the main memory 1606 and/or within the processors 1602 during execution thereof by the computer system 1600. The main memory 1606 and the processors 1602 also constitute machine-readable media.

While the computer-readable medium 1620 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, and optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Python, Javascript, Go, or other compilers, assemblers, interpreters or other computer languages or platforms.

Thus, systems and methods for content-based organization of a file system are disclosed. Although embodiments have been described with reference to specific example embodiments, it may be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for organizing and managing a file system on top of a content addressable object store, the method comprising:

associating a record with a user content, the record including attributes associated with the user content, the attributes including at least a content hash associated with an address in the content addressable object store;

dividing the user content into data objects, each of the data objects having a predetermined minimum size;

generating, for each of the data objects, respective data object hashes, the data object hashes being functions of respective data object contents associated with the data objects;

generating a pointer tree based on the data object hashes, the generating of the pointer tree comprising:

grouping the data object hashes into pointer objects;

assigning the pointer objects as leaves of a layer in the pointer tree;

when the layer includes more than one leaf, constructing a next layer of the pointer tree, the construction of the next layer comprising:

generating pointer hashes for each of the pointer objects, the pointer hashes being functions of respective pointer object contents associated with the pointer objects;

grouping the pointer hashes into further pointer objects, each of the further pointer objects having the predetermined minimum size;

assigning the further pointer objects as leaves of a further layer in the pointer tree; and repeating the generating the pointer hashes, the grouping the pointer hashes, and assigning the further pointer objects until a final layer having one leaf is received;

assigning the leaf of the final layer as a root of the pointer tree; and computing a root pointer hash based on a content of the root of the pointer tree;

setting the content hash to the root pointer hash; and writing the data objects to a cluster storage.

2. The method of claim 1, wherein the depth of the pointer tree is determined by the following equation: $MaxFileSize=BLKSZ\times(truncate(BLKSZ\div SMASHSZ))^{depth}$, wherein MaxFileSize is a size of the user content, BLKSZ is the predetermined minimum size, SMASHSZ is a size of the content hash, and the truncate is a function of a real number returning integer part of the real number.

3. The method of claim 1, wherein the user content includes one or more of the following: a data file and a folder.

4. The method of claim 3, wherein the folder includes at least one folder entry associated with a further record, the further record associated with a further user content, the at least one folder entry including at least one of the following:

a type of entry associated with a type of the further user content;

a length of entry associated with a length of the further user content;

a name of entry associated with a name of the further user content; and an attribute of the entry associated with a further content hash, the further content hash being generated based on the attributes of the further record.

5. The method of claim 4, wherein the folder includes one or more entries associated with further records, each of the further records associated with a unique time version of the user content.

6. The method of claim 3, wherein the attributes of the record include a previous content hash, the previous content hash being generated based on a content associated with attributes of a previous record, the previous record being associated with a respective previous version of the user content.

7. The method of claim 6, further comprising, in response to a change in the user content:

at least partially regenerating the pointer tree associated with the user content;

generating a further record;

setting the content hash of the further record to a pointer hash associated with the root of the regenerated pointer tree;

computing a record content hash based on a content associated with the attributes of the record; and setting the previous content hash of the further record to the record content hash.

8. The method of claim 1, wherein the writing of each of the data objects to the cluster storage comprises:

receiving the data object and a type of the data object;

computing the data object hash;

determining physical nodes of the cluster storage, the physical nodes including a copy of the data object; and performing the following steps on each of the determined physical nodes:

looking up the data object hash in the content addressable object store to obtain data object metadata, the metadata including at least a disk identifier and a location within the disk; and when the data object hash is not found:

writing a copy of the data object to the node; and updating the content addressable object store with new metadata associated with the data object.

9. The method of claim 8, further comprising writing a file to the cluster storage, the writing of the file comprising:

receiving the file;

splitting the file into file data objects;

computing file data object hashes for the file data objects;

generating a file pointer tree by:

inserting the file data object hashes into a file pointer object associated with a leaf of the file pointer tree;

when the file pointer object is full or all file data objects have been processed, computing a file pointer hash for the file pointer object and inserting the file pointer hash into a parent file pointer object; and repeating computing the file pointer hash for the file pointer object until the file pointer tree is constructed;

inserting a file pointer hash of the root of the file pointer tree into the content hash of a file record, the file record being associated with the file;

updating the attributes of the file record with at least a file size and a timestamps;

computing a record content hash based on attributes of the file record;

writing each object from a collection to the cluster storage, the collection comprising the file data objects, the file pointer objects, and the file record; and returning an indication of one of a success and a failure of the writing.

10. The method of claim 1, further comprising reading one of the data objects from the cluster storage, the reading of the data object comprising:

receiving the data object hash;

determining a set of physical nodes of the cluster storage, the physical nodes being ordered from the most likely to the least likely to have a copy of the data object;

for each ordered physical node, looking up the data object hash in the content addressable object store; and when the data object hash is found:

receiving, based on the data object hash, data object metadata including a disk identifier and location within the disk; and reading, using the data object metadata, a copy of the data object from the node.

11. The method of claim 10, further comprising reading a file from the cluster storage, the reading of the file comprising:

receiving a record content hash of a file record associated with the file;

reading the file record from the cluster storage by applying the reading the data object;

determining a root pointer hash associated with the root of a file pointer tree by fetching the content hash of the file record;

descending the file pointer tree starting with the root to fetch file pointer hashes in child leaves of the file pointer tree and reading file data objects associated with the file pointer hashes by applying the reading the data object;

reassembling the file data objects into sequential file data; and returning the sequential file data.

12. A system for organizing and managing a file system on top of a content addressable object store, the system comprising:

at least one processor; and a memory communicatively coupled to the at least one processor, the memory storing instructions, which, when executed by the at least one processor, perform a method comprising:

associating a record with a user content, the record including attributes associated with the user content, the attributes including at least a content hash associated with an address in the content addressable object store;

dividing the user content into data objects, each of the data objects having a predetermined minimum size;

generating, for each of the data objects, respective data object hashes, the data object hashes being functions of respective data object contents associated with the data objects;

generating a pointer tree based on the data object hashes, the generating of the pointer tree comprising:

grouping the data object hashes into pointer objects;

assigning the pointer objects as leaves of a layer in the pointer tree;

when the layer includes more than one leaf, constructing a next layer of the pointer tree, the construction of the next layer comprising:

generating pointer hashes for each of the pointer objects, the pointer hashes being functions of respective pointer object contents associated with the pointer objects;

grouping the pointer hashes into further pointer objects, each of the further pointer objects having the predetermined minimum size;

assigning the further pointer objects as leaves of a further layer in the pointer tree; and repeating the generating the pointer hashes, the grouping the pointer hashes, and assigning the further pointer objects until a final layer having one leaf is received;

assigning the leaf of the final layer as a root of the pointer tree; and computing a root pointer hash based on a content of the root of the pointer tree;

setting the content hash to the root pointer hash; and writing the data objects to a cluster storage.

13. The system of claim 12, wherein the depth of the pointer tree is determined by the following equation: $\text{MaxFileSize}=\text{BLKSZ}\times(\text{truncate}(\text{BLKSZ}\div\text{SMASHSZ}))^{depth}$, wherein MaxFileSize is a size of the user content, BLKSZ is the predetermined minimum size, SMASHSZ is a size of the content hash, and the truncate is a function of a real number returning integer part of the real number.

14. The system of claim 12, wherein the user content includes one or more of the following: a data file and a folder.

15. The system of claim 14, wherein the folder includes at least one folder entry associated with a further record, the further record associated with a further user content, the at least one folder entry including at least one of the following:

a type of entry associated with a type of the further user content;

a length of entry associated with a length of the further user content;

a name of entry associated with a name of the further user content; and an attribute of the entry associated with a further content hash, the further content hash being generated based on the attributes of the further record.

16. The system of claim 15, wherein the folder includes one or more entries associated with further records, each of the further records associated with a unique time version of the user content.

17. The system of claim 14, wherein the attributes of the record include a previous content hash, the previous content hash being generated based on a content associated with attributes of a previous record, the previous record associated with a respective previous version of the user content.

18. The system of claim 17, further comprising, in response to a change in the user content:

at least partially regenerating the pointer tree associated with the user content;

generating a further record;

setting the content hash of the further record to a pointer hash associated with the root of the regenerated pointer tree;

computing a record content hash based on a content associated with the attributes of the record; and setting the previous content hash of the further record to the record content hash.

19. The system of claim 12, wherein the writing of each of the data objects to the cluster storage comprises:

receiving the data object and a type of the data object;

computing the data object hash;

determining physical nodes of the cluster storage, the physical nodes including a copy of the data object; and performing the following steps on each of the determined physical nodes:

looking up the data object hash in the content addressable object store to obtain data object metadata, the metadata including at least a disk identifier and a location within the disk; and when the data object hash is not found:

writing a copy of the data object to the node; and updating the content addressable object store with new metadata associated with the data object.

20. The system of claim 19, further comprising writing a file to the cluster storage, the writing of the file comprising:

receiving the file;

splitting the file into file data objects;

computing file data object hashes for the file data objects;

generating a file pointer tree by:

inserting the file data object hashes into a file pointer object associated with a leaf of the file pointer tree;

when the file pointer object is full or all file data objects have been processed, computing a file pointer hash for the file pointer object and inserting the file pointer hash into a parent file pointer object; and repeating computing the file pointer hash for the file pointer object until the file pointer tree is constructed;

inserting a file pointer hash of the root of the file pointer tree into the content hash of a file record, the file record being associated with the file;

updating the attributes of the file record with at least a file size and a timestamp;

computing a record content hash based on attributes of the file record;

writing each object from a collection to the cluster storage, the collection comprising the file data objects, the file pointer objects, and the file record; and returning an indication of one of a success and a failure of the writing.

21. The system of claim 12, further comprising reading one of the data objects from the cluster storage, the reading of the data object comprising:

receiving the data object hash;

determining a set of physical nodes of the cluster storage, the physical nodes being ordered from the most likely to the least likely to have a copy of the data object;

for each ordered physical node, looking up the data object hash in the content addressable object store; and when the data object hash is found:

receiving, based on the data object hash, data object metadata including a disk identifier and location within the disk; and reading, using the data object metadata, a copy of the data object from the node.

22. The system of claim 21, further comprising reading a file from the cluster storage, the reading of the file comprising:

receiving a record content hash of a file record associated with the file;

reading the file record from the cluster storage by applying the reading the data object;

determining a root pointer hash associated with the root of a file pointer tree by fetching the content hash of the file record;

descending the file pointer tree starting with the root to fetch file pointer hashes in child leaves of the file pointer tree and read file data objects associated with the file pointer hashes by applying the reading the data object;

reassembling the file data objects into sequential file data; and returning the sequential file data.

23. A non-transitory computer-readable storage medium having embodied thereon instructions, which, when executed by one or more processors, perform a method for organizing and managing a file system on top of a content addressable object store, the method comprising:

associating a record with a user content, the record including attributes associated with the user content, the attributes including at least a content hash associated with an address in the content addressable object store;

dividing the user content into data objects, each of the data objects having a predetermined minimum size;

generating, for each of the data objects, respective data object hashes, the data object hashes being a function of respective data object contents associated with the data objects;

generating a pointer tree based on the data object hashes, the generating of the pointer tree comprising:

grouping the data object hashes into pointer objects;

assigning the pointer objects as leaves of a layer in the pointer tree;

when the layer includes more than one leaf, constructing a next layer of the pointer tree, the construction of the next layer comprising:

generating pointer hashes for each of the pointer objects, the pointer hashes being functions of respective pointer object contents associated with the pointer objects;

grouping the pointer hashes into further pointer objects, each of the further pointer objects having the predetermined minimum size;

assigning the further pointer objects as leaves of a further layer in the pointer tree; and repeating the generating the pointer hashes, the grouping the pointer hashes, and assigning the further pointer objects until a final layer having one leaf is received;

assigning the leaf of the final layer as a root of the pointer tree; and computing a root pointer hash based on a content of the root of the pointer tree;

setting the content hash to the root pointer hash; and writing the data objects to a cluster storage.

* * * * *